US012748780B2

(12) United States Patent
Kundu et al.

(10) Patent No.: US 12,748,780 B2
(45) Date of Patent: Sep. 29, 2026

(54) OBSERVABILITY DATA RELATIONSHIP GRAPHS

(71) Applicant: Cisco Technology, Inc., San Jose, CA (US)

(72) Inventors: Ashish Kundu, San Jose, CA (US); Ramana Rao V. R. Kompella, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/120,589

(22) Filed: Mar. 13, 2023

(65) Prior Publication Data

US 2024/0311395 A1 Sep. 19, 2024

(51) Int. Cl.
*G06F 16/28* (2019.01)
*G06F 11/34* (2006.01)

(52) U.S. Cl.
CPC ........ *G06F 16/285* (2019.01); *G06F 11/3476* (2013.01)

(58) Field of Classification Search
CPC ........................... G06F 16/285; G06F 11/3476
See application file for complete search history.

(56) References Cited

U.S. PATENT DOCUMENTS

| | | | |
|---|---|---|---|
| 11,212,306 B2 | 12/2021 | Patterson et al. | |
| 11,218,498 B2 | 1/2022 | Hajimirsadeghi et al. | |
| 11,250,069 B1 * | 2/2022 | Bianchi | G06F 16/9038 |
| 11,307,915 B1 | 4/2022 | Shwartz et al. | |
| 11,362,902 B2 | 6/2022 | Arrabolu et al. | |
| 11,704,219 B1 * | 7/2023 | Lerner | G06F 11/327 714/57 |
| 2018/0219752 A1 * | 8/2018 | Wang | H04L 41/22 |
| 2018/0268014 A1 * | 9/2018 | Holley | H04L 12/00 |
| 2020/0074012 A1 * | 3/2020 | Huebner | H04L 63/1425 |
| 2020/0167205 A1 * | 5/2020 | Guim Bernat | H04L 9/3213 |
| 2020/0169565 A1 * | 5/2020 | Badawy | G06F 21/552 |
| 2020/0382557 A1 * | 12/2020 | Woolward | H04L 63/1441 |

(Continued)

OTHER PUBLICATIONS

Aasman, Jans, “Why Enterprise Knowledge Graphs Need Semantics”, Oct. 2, 2017, BigDATAwire. A TCI Media Publication, <https://www.hpcwire.com/bigdatawire/2017/10/02/enterprise-knowledge-graphs-need-semantics/> (Year: 2017).*

(Continued)

*Primary Examiner* — Syed H Hasan
*Assistant Examiner* — Robert F May
(74) *Attorney, Agent, or Firm* — Lee & Hayes, P.C.

(57) ABSTRACT

According to one or more embodiments of the disclosure, an example process herein may comprise: obtaining observability data for a computer system for a given time period; determining observability entities from the observability data; converting the observability entities into contextual vertices having associated vertex attributes; determining relationships among the contextual vertices based on correlation of the observability data; selecting a subset of the relationships to be edges based on a quality of the relationships, the edges having associated edge attributes; and generating an observability graph for the observability data for the computer system for the given time period by connecting the contextual vertices via corresponding edges.

18 Claims, 8 Drawing Sheets

(56) References Cited

U.S. PATENT DOCUMENTS

| | | | | |
|---|---|---|---|---|
| 2021/0027091 | A1* | 1/2021 | Charry | H04L 41/122 |
| 2022/0019603 | A1* | 1/2022 | Puls | H04Q 9/00 |
| 2022/0394049 | A1* | 12/2022 | Abrahamian | G06F 40/134 |
| 2023/0131735 | A1* | 4/2023 | Shaker | G06N 5/01<br>706/45 |
| 2023/0229944 | A1* | 7/2023 | Otieno | G06Q 10/08<br>706/45 |
| 2023/0367694 | A1* | 11/2023 | Kholodkov | G06F 17/40 |
| 2023/0368107 | A1* | 11/2023 | Reineke | G06Q 10/06 |
| 2023/0419216 | A1* | 12/2023 | Aggarwal | G06Q 10/06316 |

OTHER PUBLICATIONS

Xu, Jia, "Observability Knowledge Graph", Sep. 15, 2022, <https://www.asserts.ai/blog/observability-knowledge-graph/> (Year: 2022).*
"Data Observability: The Missing Link in Data Governance", Jan. 22, 2026, <https://www.topquadrant.com/resources/data-observability/> (Year: 2026).*
Picoreti, et al., "Multilevel Observability in Cloud Orchestration", 2018 IEEE 16th Int. Conf. on Dependable, Autonomic & Secure Comp., 16th Int. Conf. on Pervasive Intelligence & Comp., 4th Int. Conf. on Big Data Intelligence & Comp., and 3rd Cyber Sci. & Tech. Cong, pp. 776-784, IEEE.
Xie, et al., "LogGD: Detecting Anomalies from System Logs with Graph Neural Networks", online: https://arxiv.org/abs/2209.07869, Sep. 2022, 12 pages, arXiv.

* cited by examiner

OBSERVABILITY DATA RELATIONSHIP GRAPHS

TECHNICAL FIELD

The present disclosure relates generally to computer systems, and, more particularly, to observability data relationship graphs.

BACKGROUND

The Internet and the World Wide Web have enabled the proliferation of web services available for virtually all types of businesses. Due to the accompanying complexity of the infrastructure supporting the web services, it is becoming increasingly difficult to maintain the highest level of service performance and user experience to keep up with the increase in web services. For example, it can be challenging to piece together monitoring and logging data across disparate systems, tools, and layers in a network architecture. Moreover, even when data can be obtained, it is difficult to directly connect the chain of events and cause and effect.

In particular, observability data from individual components and services of a computing network are often stored as individual data sets. Relationships may exist between such data objects and data sets. For example, logs, metrics, and traces for one component or for multiple components may have relationships between them. However, contemporary observability systems do not support identification, presentation, and/or utilization of relationships between data from different layers of computing and services. As a result, presently these relationships go unrecognized leaving a relational blind spot that may impede network management.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, an example process herein may comprise: obtaining observability data for a computer system for a given time period; determining observability entities from the observability data; converting the observability entities into contextual vertices having associated vertex attributes; determining relationships among the contextual vertices based on correlation of the observability data; selecting a subset of the relationships to be edges based on a quality of the relationships, the edges having associated edge attributes; and generating an observability graph for the observability data for the computer system for the given time period by connecting the contextual vertices via corresponding edges.

Other embodiments are described below, and this overview is not meant to limit the scope of the present disclosure.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1:
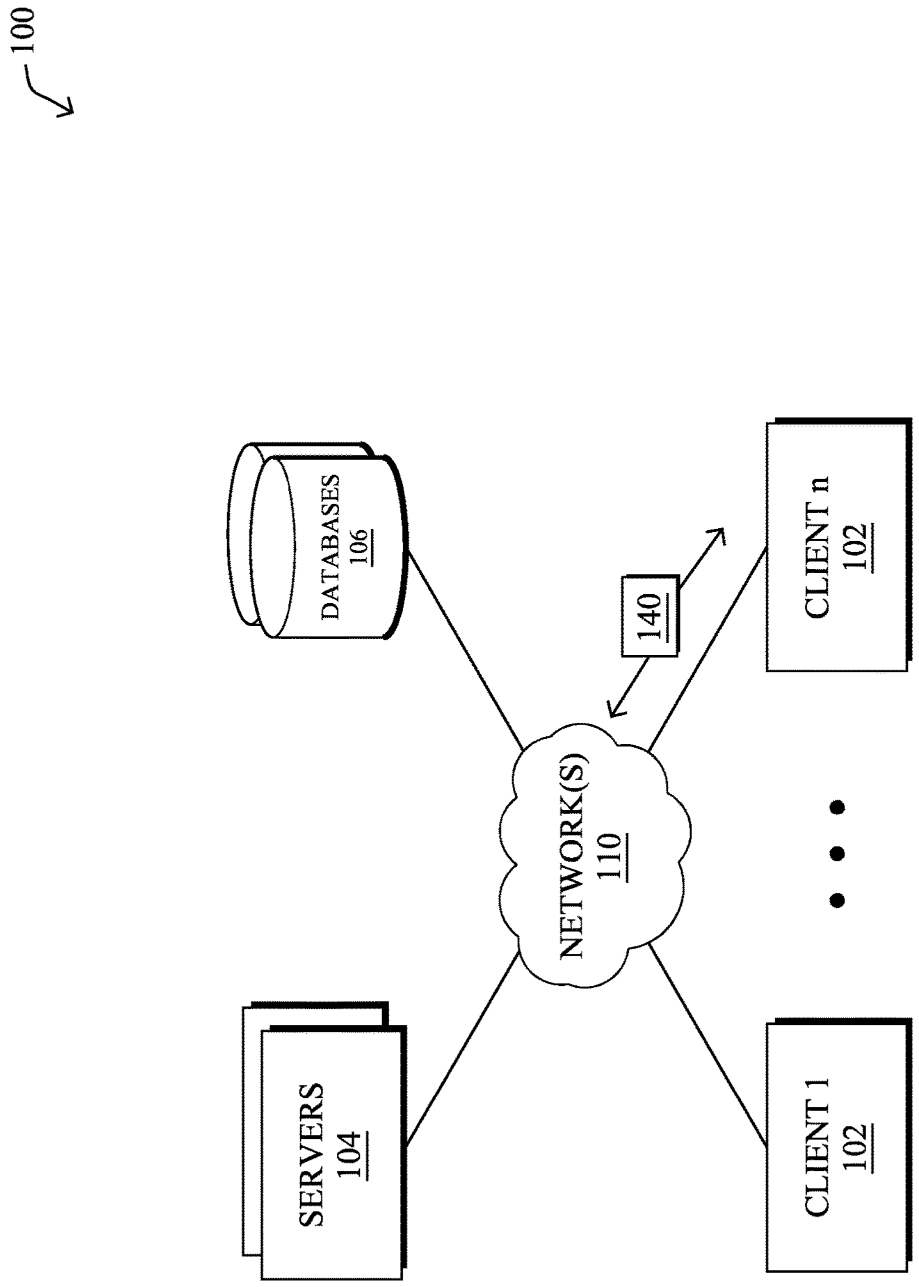
FIG. 1 illustrates an example computer network.

FIG. 1 is a schematic block diagram of an example simplified computing system 100 illustratively comprising any number of client devices 102 (e.g., a first through nth client device), one or more servers 104, and one or more databases 106, where the devices may be in communication with one another via any number of networks 110. The one or more networks 110 may include, as would be appreciated, any number of specialized networking devices such as routers, switches, access points, etc., interconnected via wired and/or wireless connections. For example, devices 102-104 and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, or any other form of computing device capable of participating with other devices via network(s) 110.

Notably, in some embodiments, servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art.

Those skilled in the art will also understand that any number of nodes, devices, links, etc. may be used in computing system 100, and that the view shown herein is for simplicity. Also, those skilled in the art will further understand that while the network is shown in a certain orientation, the system 100 is merely an example illustration that is not meant to limit the disclosure.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

Figure 2:
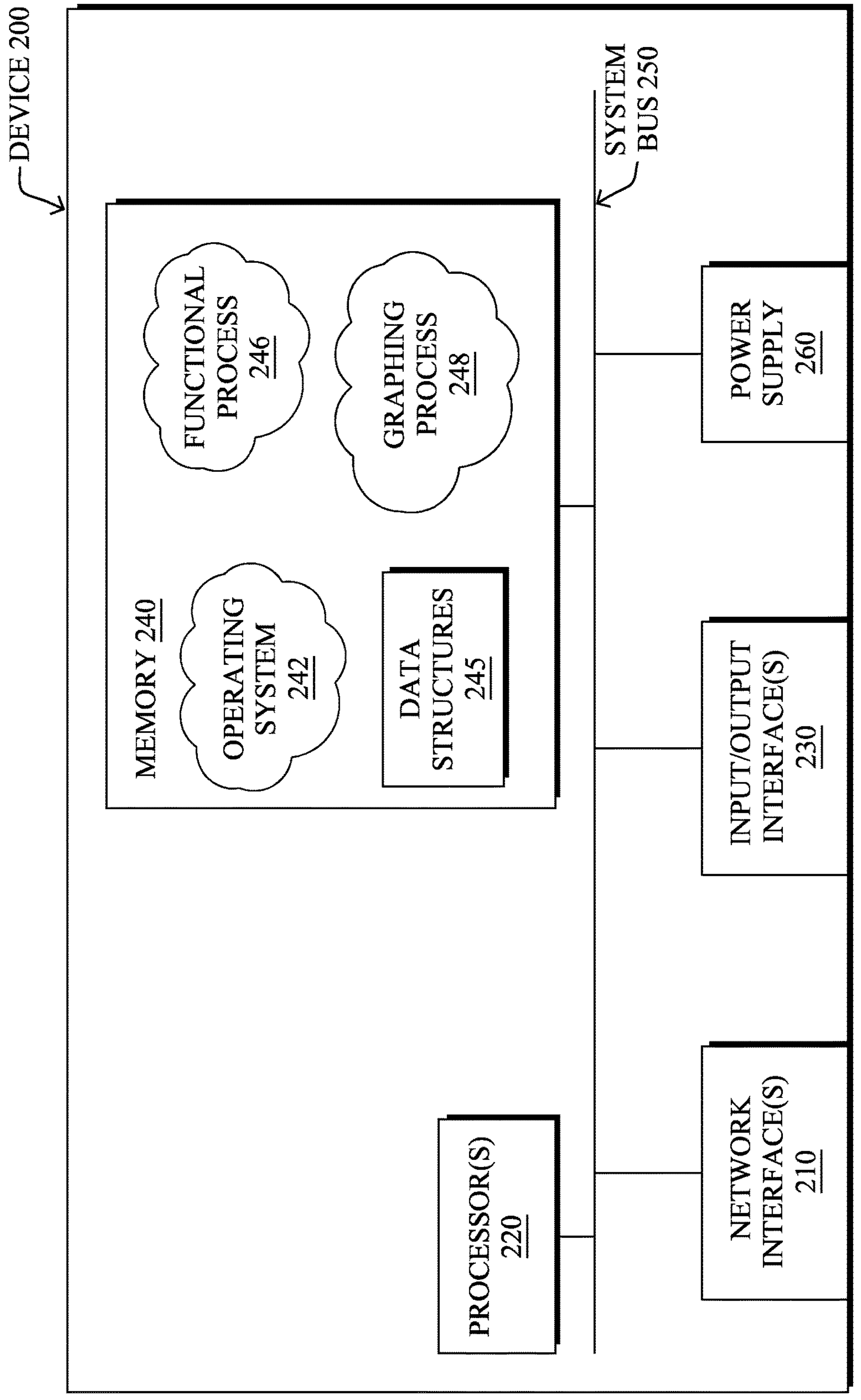
FIG. 2 illustrates an example computing device/node.

FIG. 2 is a schematic block diagram of an example node/device 200 that may be used with one or more embodiments described herein, e.g., as any of the devices 102-106 shown in FIG. 1 above. Device 200 may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network(s) 110. The network interfaces may be configured to transmit and/or receive data using a variety of different communication protocols. Note, further, that device 200 may have multiple types of network connections via interfaces 210, e.g., wireless and wired/physical connections, and that the view herein is merely for illustration.

Depending on the type of device, other interfaces, such as input/output (I/O) interfaces 230, user interfaces (UIs), and so on, may also be present on the device. Input devices, in particular, may include an alpha-numeric keypad (e.g., a keyboard) for inputting alpha-numeric and other information, a pointing device (e.g., a mouse, a trackball, stylus, or cursor direction keys), a touchscreen, a microphone, a camera, and so on. Additionally, output devices may include speakers, printers, particular network interfaces, monitors, etc.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise a one or more functional processes 246, and on certain devices, an illustrative graphing process 248, as described herein. Notably, functional processes 246, when executed by processor(s) 220, cause each particular device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

—Observability Intelligence Platform—

As noted above, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a software as a service (SaaS) over a network, such as the Internet. As an example, a distributed application can be implemented as a SaaS-based web service available via a web site that can be accessed via the Internet. As another example, a distributed application can be implemented using a cloud provider to deliver a cloud-based service.

Users typically access cloud-based/web-based services (e.g., distributed applications accessible via the Internet) through a web browser, a light-weight desktop, and/or a mobile application (e.g., mobile app) while the enterprise software and user's data are typically stored on servers at a remote location. For example, using cloud-based/web-based services can allow enterprises to get their applications up and running faster, with improved manageability and less maintenance, and can enable enterprise IT to more rapidly adjust resources to meet fluctuating and unpredictable business demand. Thus, using cloud-based/web-based services can allow a business to reduce Information Technology (IT) operational costs by outsourcing hardware and software maintenance and support to the cloud provider.

However, a significant drawback of cloud-based/web-based services (e.g., distributed applications and SaaS-based solutions available as web services via web sites and/or using other cloud-based implementations of distributed applications) is that troubleshooting performance problems can be very challenging and time consuming. For example, determining whether performance problems are the result of the cloud-based/web-based service provider, the customer's own internal IT network (e.g., the customer's enterprise IT network), a user's client device, and/or intermediate network providers between the user's client device/internal IT network and the cloud-based/web-based service provider of a distributed application and/or web site (e.g., in the Internet) can present significant technical challenges for detection of such networking related performance problems and determining the locations and/or root causes of such networking related performance problems. Additionally, determining whether performance problems are caused by the network or an application itself, or portions of an application, or particular services associated with an application, and so on, further complicate the troubleshooting efforts.

Certain aspects of one or more embodiments herein may thus be based on (or otherwise relate to or utilize) an observability intelligence platform for network and/or application performance management. For instance, solutions are available that allow customers to monitor networks and applications, whether the customers control such networks and applications, or merely use them, where visibility into such resources may generally be based on a suite of "agents" or pieces of software that are installed in different locations in different networks (e.g., around the world).

Specifically, as discussed with respect to illustrative FIG. 3 below, performance within any networking environment may be monitored, specifically by monitoring applications and entities (e.g., transactions, tiers, nodes, and machines) in the networking environment using agents installed at individual machines at the entities. As an example, applications may be configured to run on one or more machines (e.g., a customer will typically run one or more nodes on a machine, where an application consists of one or more tiers, and a tier consists of one or more nodes). The agents collect data associated with the applications of interest and associated nodes and machines where the applications are being operated. Examples of the collected data may include performance data (e.g., metrics, metadata, etc.) and topology data (e.g., indicating relationship information), among other configured information. The agent-collected data may then be provided to one or more servers or controllers to analyze the data.

Examples of different agents (in terms of location) may comprise cloud agents (e.g., deployed and maintained by the observability intelligence platform provider), enterprise agents (e.g., installed and operated in a customer's network), and endpoint agents, which may be a different version of the previous agents that is installed on actual users' (e.g., employees') devices (e.g., on their web browsers or otherwise). Other agents may specifically be based on categorical configurations of different agent operations, such as language agents (e.g., Java agents, .Net agents, PHP agents, and others), machine agents (e.g., infrastructure agents residing on the host and collecting information regarding the machine which implements the host such as processor usage, memory usage, and other hardware information), and network agents (e.g., to capture network information, such as data collected from a socket, etc.).

Each of the agents may then instrument (e.g., passively monitor activities) and/or run tests (e.g., actively create events to monitor) from their respective devices, allowing a customer to customize from a suite of tests against different networks and applications or any resource that they're interested in having visibility into, whether it's visibility into that end point resource or anything in between, e.g., how a device is specifically connected through a network to an end resource (e.g., full visibility at various layers), how a website is loading, how an application is performing, how a particular business transaction (or a particular type of business transaction) is being effected, and so on, whether for individual devices, a category of devices (e.g., type, location, capabilities, etc.), or any other suitable embodiment of categorical classification.

Figure 3:
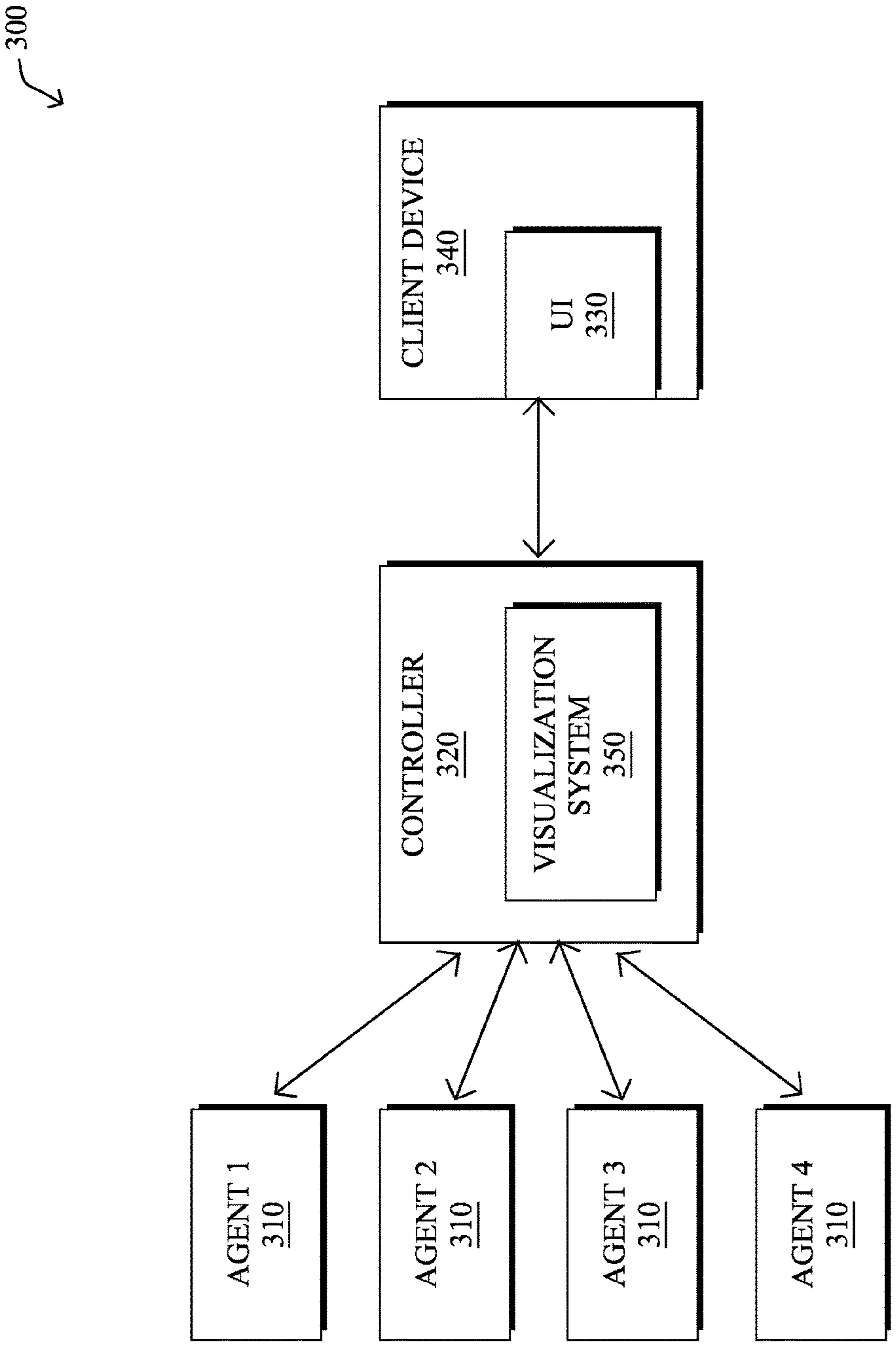
FIG. 3 illustrates an example observability intelligence platform.

FIG. 3 is a block diagram of an example observability intelligence platform 300 that can implement one or more aspects of the techniques herein. The observability intelligence platform is a system that monitors and collects metrics of performance data for a network and/or application environment being monitored. At the simplest structure, the observability intelligence platform includes one or more agents 310 and one or more servers/controllers 320. Agents may be installed on network browsers, devices, servers, etc., and may be executed to monitor the associated device and/or application, the operating system of a client, and any other application, API, or another component of the associated device and/or application, and to communicate with (e.g., report data and/or metrics to) the controller(s) 320 as directed. Note that while FIG. 3 shows four agents (e.g., Agent 1 through Agent 4) communicatively linked to a single controller, the total number of agents and controllers can vary based on a number of factors including the number of networks and/or applications monitored, how distributed the network and/or application environment is, the level of monitoring desired, the type of monitoring desired, the level of user experience desired, and so on.

For example, instrumenting an application with agents may allow a controller to monitor performance of the application to determine such things as device metrics (e.g., type, configuration, resource utilization, etc.), network browser navigation timing metrics, browser cookies, application calls and associated pathways and delays, other aspects of code execution, etc. Moreover, if a customer uses agents to run tests, probe packets may be configured to be sent from agents to travel through the Internet, go through many different networks, and so on, such that the monitoring solution gathers all of the associated data (e.g., from returned packets, responses, and so on, or, particularly, a lack thereof). Illustratively, different "active" tests may comprise HTTP tests (e.g., using curl to connect to a server and load the main document served at the target), Page Load tests (e.g., using a browser to load a full page—i.e., the main document along with all other components that are included in the page), or Transaction tests (e.g., same as a Page Load, but also performing multiple tasks/steps within the page—e.g., load a shopping website, log in, search for an item, add it to the shopping cart, etc.).

The controller 320 is the central processing and administration server for the observability intelligence platform. The controller 320 may serve a browser-based user interface (UI) 330 that is the primary interface for monitoring, analyzing, and troubleshooting the monitored environment. Specifically, the controller 320 can receive data from agents 310 (and/or other coordinator devices), associate portions of data (e.g., topology, business transaction end-to-end paths and/or metrics, etc.), communicate with agents to configure collection of the data (e.g., the instrumentation/tests to execute), and provide performance data and reporting through the interface 330. The interface 330 may be viewed as a web-based interface viewable by a client device 340. In some implementations, a client device 340 can directly communicate with controller 320 to view an interface for monitoring data. The controller 320 can include a visualization system 350 for displaying the reports and dashboards related to the disclosed technology. In some implementations, the visualization system 350 can be implemented in a separate machine (e.g., a server) different from the one hosting the controller 320.

Notably, in an illustrative Software as a Service (SaaS) implementation, a controller 320 instance may be hosted remotely by a provider of the observability intelligence platform 300. In an illustrative on-premises (On-Prem) implementation, a controller 320 instance may be installed locally and self-administered.

The controllers 320 receive data from different agents 310 (e.g., Agents 1-4) deployed to monitor networks, applications, databases and database servers, servers, and end user clients for the monitored environment. Any of the agents 310 can be implemented as different types of agents with specific monitoring duties. For example, application agents may be installed on each server that hosts applications to be monitored. Instrumenting an agent adds an application agent into the runtime process of the application.

Database agents, for example, may be software (e.g., a Java program) installed on a machine that has network access to the monitored databases and the controller. Standalone machine agents, on the other hand, may be standalone programs (e.g., standalone Java programs) that collect hardware-related performance statistics from the servers (or other suitable devices) in the monitored environment. The standalone machine agents can be deployed on machines that host application servers, database servers, messaging servers, Web servers, etc. Furthermore, end user monitoring (EUM) may be performed using browser agents and mobile agents to provide performance information from the point of view of the client, such as a web browser or a mobile native application. Through EUM, web use, mobile use, or combinations thereof (e.g., by real users or synthetic agents) can be monitored based on the monitoring needs.

Note that monitoring through browser agents and mobile agents are generally unlike monitoring through application agents, database agents, and standalone machine agents that are on the server. In particular, browser agents may generally be embodied as small files using web-based technologies, such as JavaScript agents injected into each instrumented web page (e.g., as close to the top as possible) as the web page is served and are configured to collect data. Once the web page has completed loading, the collected data may be bundled into a beacon and sent to an EUM process/cloud for processing and made ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases. A mobile agent, on the other hand, may be a small piece of highly performant code that gets added to the source of the mobile application. Mobile RUM provides information on the native mobile application (e.g., iOS or Android applications) as the end users actually use the mobile application. Mobile RUM provides visibility into the functioning of the mobile application itself and the mobile application's interaction with the network used and any server-side applications with which the mobile application communicates.

Note further that in certain embodiments, in the application intelligence model, a business transaction represents a particular service provided by the monitored environment. For example, in an e-commerce application, particular real-world services can include a user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

A business transaction, in particular, is a representation of the particular service provided by the monitored environment that provides a view on performance data in the context of the various tiers that participate in processing a particular request. That is, a business transaction, which may be identified by a unique business transaction identification (ID), represents the end-to-end processing path used to fulfill a service request in the monitored environment (e.g., adding items to a shopping cart, storing information in a database, purchasing an item online, etc.). Thus, a business transaction is a type of user-initiated action in the monitored environment defined by an entry point and a processing path across application servers, databases, and potentially many other infrastructure components. Each instance of a business transaction is an execution of that transaction in response to a particular user request (e.g., a socket call, illustratively associated with the TCP layer). A business transaction can be created by detecting incoming requests at an entry point and tracking the activity associated with request at the originating tier and across distributed components in the application environment (e.g., associating the business transaction with a 4-tuple of a source IP address, source port, destination IP address, and destination port). A flow map can be generated for a business transaction that shows the touch points for the business transaction in the application environment. In one embodiment, a specific tag may be added to packets by application specific agents for identifying business transactions (e.g., a custom header field attached to a hypertext transfer protocol (HTTP) payload by an application agent, or by a network agent when an application makes a remote socket call), such that packets can be examined by network agents to identify the business transaction identifier (ID) (e.g., a Globally Unique Identifier (GUID) or Universally Unique Identifier (UUID)). Performance monitoring can be oriented by business transaction to focus on the performance of the services in the application environment from the perspective of end users. Performance monitoring based on business transactions can provide information on whether a service is available (e.g., users can log in, check out, or view their data), response times for users, and the cause of problems when the problems occur.

In accordance with certain embodiments, the observability intelligence platform may use both self-learned baselines and configurable thresholds to help identify network and/or application issues. A complex distributed application, for example, has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed observability intelligence platform can perform anomaly detection based on dynamic baselines or thresholds, such as through various machine learning techniques, as may be appreciated by those skilled in the art. For example, the illustrative observability intelligence platform herein may automatically calculate dynamic baselines for the monitored metrics, defining what is "normal" for each metric based on actual usage. The observability intelligence platform may then use these baselines to identify subsequent metrics whose values fall out of this normal range.

In general, data/metrics collected relate to the topology and/or overall performance of the network and/or application (or business transaction) or associated infrastructure, such as, e.g., load, average response time, error rate, percentage CPU busy, percentage of memory used, etc. The controller UI can thus be used to view all of the data/metrics that the agents report to the controller, as topologies, heatmaps, graphs, lists, and so on. Illustratively, data/metrics can be accessed programmatically using a Representational State Transfer (REST) API (e.g., that returns either the JavaScript Object Notation (JSON) or the extensible Markup Language (XML) format). Also, the REST API can be used to query and manipulate the overall observability environment.

Those skilled in the art will appreciate that other configurations of observability intelligence may be used in accordance with certain aspects of the techniques herein, and that other types of agents, instrumentations, tests, controllers, and so on may be used to collect data and/or metrics of the network(s) and/or application(s) herein. Also, while the description illustrates certain configurations, communication links, network devices, and so on, it is expressly contemplated that various processes may be embodied across multiple devices, on different devices, utilizing additional devices, and so on, and the views shown herein are merely simplified examples that are not meant to be limiting to the scope of the present disclosure. The observability intelligence platform and methods described herein are also applicable to monolithic systems (that are not distributed systems) such as the MACOS or Windows based system running a browser or running the MSOFFICE application, and/or decentralized systems such as smart contracts running on blockchain-based de-centralized systems.

—Observability Data Relationship Graphs—

As noted above, observability data from individual components are often stored as individual datasets. There may be relationships between such data objects and datasets (e.g., logs, metrics, traces, etc.). Presently, these relationships between data from different layers of computing and/or services are not supported in observability systems.

In contrast, the techniques herein, therefore, provide mechanisms for constructing observability data relationship graphs. These techniques may be utilized to identify, represent, and/or use relationships between data objects and datasets to correlate the behavior of network components and/or their roles in network performance. These techniques may facilitate holistic analysis of network performance that incorporates pre-computed relationships and/or behavioral correlations into decision making regarding network management, debugging, etc. For example, from the pre-computed relationships and/or behavioral correlations, distributed tracing and analysis may be greatly improved in terms of efficiency, semantics, querying, and/or data management.

Specifically, according to one or more embodiments described herein, an example process herein may comprise: obtaining observability data for a computer network for a given time period; determining observability entities from the observability data; converting the observability entities into contextual vertices having associated vertex attributes; determining relationships among the contextual vertices based on correlation of the observability data; selecting a subset of the relationships to be edges based on a quality of the relationships, the edges having associated edge attributes; and generating an observability graph for the observability data for the computer network for the given time period by connecting the contextual vertices via corresponding edges.

Notably, the techniques herein may employ any number of machine learning techniques, such as to classify the collected data and to cluster the data as described herein (e.g., identifying and/or representing data relationships). In general, machine learning is concerned with the design and the development of techniques that receive empirical data as input (e.g., collected metric/event data from agents, sensors, etc.) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a,b,c such that the number of misclassified points is minimal. After this optimization/learning phase, the techniques herein can use the model M to classify new data points. Often, M is a statistical model, and the cost function is inversely proportional to the likelihood of M, given the input data.

One class of machine learning techniques that is of particular use herein is clustering. Generally speaking, clustering is a family of techniques that seek to group data according to some typically predefined or otherwise determined notion of similarity.

Also, the performance of a machine learning model can be evaluated in a number of ways based on the number of true positives, false positives, true negatives, and/or false negatives of the model.

In various embodiments, such techniques may employ one or more supervised, unsupervised, or semi-supervised machine learning models. Generally, supervised learning entails the use of a training set of data, as noted above, that is used to train the model to apply labels to the input data. On the other end of the spectrum are unsupervised techniques that do not require a training set of labels. Notably, while a supervised learning model may look for previously seen patterns that have been labeled as such, an unsupervised model may attempt to analyze the data without applying a label to it. Semi-supervised learning models take a middle ground approach that uses a greatly reduced set of labeled training data.

Example machine learning techniques that the techniques herein can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) artificial neural networks (ANNs) (e.g., for non-linear models), replicating reservoir networks (e.g., for non-linear models, typically for time series), random forest classification, or the like. Graph learning systems and methods such as graph neural network (Graph NNs) can also be applied.

Figure 4:
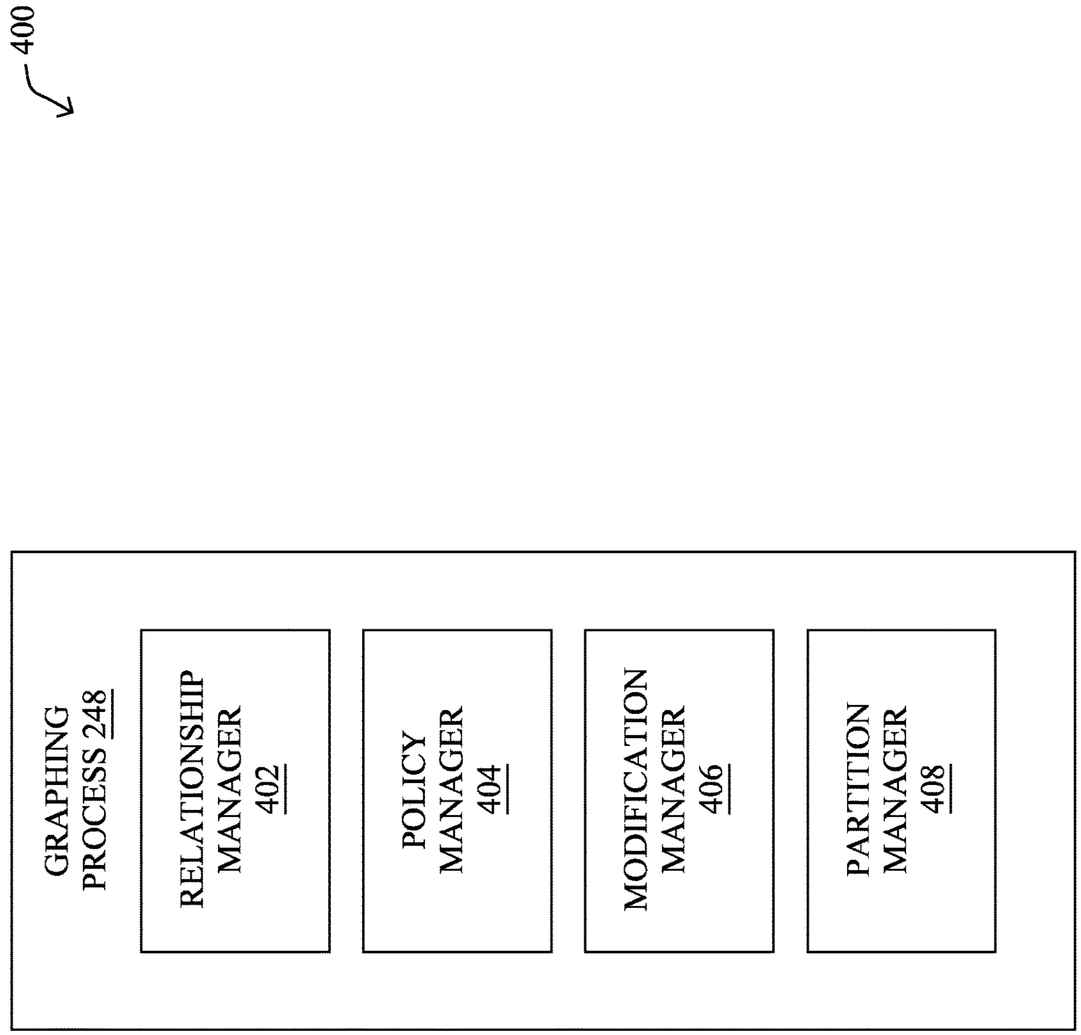
FIG. 4 illustrates an example of an architecture for observability data relationship graphing.

Operationally, FIG. 4 illustrates an example of an architecture 400 for observability data relationship graphing, according to various embodiments. At the core of architecture 400 is graphing process 248, which may be executed by a device that provides a portion of an observability intelligence platform and/or a visualization system for visualizing observability data for a computing system, or another device in communication therewith. In general, graphing process 248 may be executed to provide observability data relationship graphs and, therefore, may be executed on any device associated with the collection, processing, presentation, etc. of observability data for a computing system.

As shown, graphing process 248 may include a relationship manager 402, a policy manager 404, a modification manager 406, and/or partition manager 408. As would be appreciated, the functionalities of these components may be combined or omitted, as desired. In addition, these components may be implemented on a singular device or in a distributed manner, in which case the combination of executing device can be viewed as their own singular device for purposes of executing graphing process 248.

Graphing process 248 may obtain observability data obtained from a computer network for a given period of time. For example, graphing process 248 may obtain observability data such as logs, metrics, traces, and/or other outputs of observability analytics. This observability data may be collected via an observability intelligence platform and/or other mechanisms of observability data collection and/or aggregation. Graphing process 248 may perform operations (e.g., computations, transformations, etc.) to the collected observability data.

For example, during execution, relationship manager 402 may perform directed and/or undirected pre-computation of relationships between observability data. The result of the pre-computation may be construction of an observability graph (e.g., "ograph"). The pre-computation of these relationships and/or construction of the ograph may be conceptualized as occurring in two phases and/or by two graphing operations. These two phases and/or graphing operations may involve construction and/or maintenance of a first input observability graph (in-ograph) and/or the construction and/or maintenance of a second output observability graph (out-ograph). In some examples, the in-ograph and the out-ograph may be separate graphs that are maintained separately, or they may be logically separate graphs that correspond to different phases, computations, transformations, etc. leading to the construction of a single observability graph.

In various embodiments, the in-ograph may correspond to a first phase of computation for observability graphing of input data such as logs, metrics, traces, etc. The out-ograph may correspond to a second phase of computation for observability graphing including computations that combine the in-ograph and outputs of observability such as analytics, root cause analysis, etc.

Relationship manager 402 may construct the ograph (which may include the in-ograph and/or the out-ograph) from the observability data and systems and/or services under observation from which observability data is collected. Construction of the ograph by relationship manager 402 may include the addition of one or more vertices (e.g., contextual vertices) to the ograph. Each vertex in the ograph may be formed to represent an atomic unit of data (e.g., a log entry, a portion of a log entry, a measure of a metric, a unit of trace, etc.).

Construction of the ograph by relationship manager 402 may include the addition of one or more edges to the ograph. Each edge in the ograph may be formed to represent a relation between two vertices in the ograph. Each edge may be directed or undirected and representative of the corresponding relationship between two vertices with which it is associated. The relation between the vertices may be temporal, spatial (e.g., from where a log entry originated, to where a log entry refers to, etc.), causal, and/or some other relationship.

The ograph may be constructed statically or dynamically by the relationship manager 402. For example, relationship manager 402 may utilize analysis, correlation, and/or machine learning techniques in order to determine, infer, and/or predict the edges between the vertices and/or to apply labels to those edges. In various examples, relationship manager 402 may be updated dynamically based on any new observability data and/or the addition of any new components in the network. Relationship manager 402 may also refine the existing data of the ograph using a variety of mechanisms.

Relationship manager 402 may cause the ograph and/or its underlying data to be stored. For example, relationship manager 402 may store the data in a graph database and/or as a set of adjacency lists or as an adjacency matrix. In various embodiments, one or more incident subgraph of the ograph may represent all datasets relevant to a component. The ograph may include a path that represents how a state of the system component X, represented by a source vertex, leads to the state of the system component Y, represented by the sink vertex. A cycle in the ograph may represent a dependency relationship or some other cyclic relationship between the data points as vertices in the cycle.

During execution, policy manager 404 may establish, manage, and/or enforce policies for the ograph and/or ograph queries. For example, policy manager 404 may specify and/or enforce policies applicable to configuration of the ograph and to queries of log and traces, metrics and their relations, etc.

A policy for the ograph may specify the allowed properties or states of the ograph. For example, a policy may represent a duration for which the ograph is generated, query policies related to the ograph, whether the ograph supports a limited number of vertices or edges, whether directed or undirected edges are allows, a semantic state, and so on. A policy may also specify the relationships allowed or disallowed (e.g., whitelists, blacklists, resp, etc.) for an ograph.

Policy manager 404 may perform policy enforcement. Policy enforcement may include enforcement of the rules specified in the policies. Therefore, enforcing the policies may include ensuring that these rules are obeyed in the formation, updating, querying, refining, and/or managing of the ograph. The policy manager 404 may also manage addressing or correcting any rule violations after they have occurred.

During execution, modification manager 406 may manage and/or perform modifications to the ograph. For example, the modification manager 406 may handle additions, removals, reorganizations, and/or other modifications to the data (e.g., vertices, edges, etc.) in the ograph. These modifications may include incorporation of new data, identification and incorporation of missing data, and/or refinement of existing data and/or its representation within an ograph.

For instance, modification manager 406 may perform semantically consistent updating of the ograph. As such, modification manager 406 may operate to ensure that the semantic state of the ograph is maintained. For example, modification manager 406 may ensure that vertices and/or relationships therebetween are preserved.

Further, modification manager 406 may perform pruning of the ograph. The pruning may occur as the graph is being created or updated and/or thereafter. Modification manager 406 may determine that vertices or edges of the ograph are inconsistent with the policy or the semantics of the ograph and may prune them. In some instances, certain sparse subgraphs without many edges and/or that are disconnected may be flagged by modification manager 406 as outliers. These outliers may then be ignored in querying dense graphs and/or pruned from the ograph. Again, this pruning may include pruning from an in-ograph or pruning from an out-ograph. The pruned vertices and/or edges may be stored or otherwise archived for future retrieval as needed.

In addition, modification manager 406 may perform prediction and/or identification of missing data sources, data elements, and/or relationships in the ograph. Modification manager 406 may make compute the predictions using graph learning such as graph neural networks. For example, modification manager 406 may utilize machine learning to analyze the existing data in the ograph. From this analysis, modification manager 406 may be able to identify potentially missing data sources, data elements, and/or relationships in the ograph and flag the omissions for correction.

During execution, partition manager 408 may manage and/or perform partitioning of the ograph. Partitioning of the ograph may include computing and implementing a slicing strategy to slice the data of the ograph into a forest of subgraphs. The forest of subgraphs may, for instance, represent certain criteria such as a performance metric of one external application programming interface (API) across a set of microservices. In various embodiments, one incident subgraph may represent all datasets relevant to a network component.

Partition manager 408 may perform fingerprinting of a component using the ograph. In various embodiments, partition manager 408 may identify and/or output a computer network component's name. For example, partition manager 408 may utilize a subgraph for a component and/or its incident edges from other vertices as an input to a graph neural network model (e.g., trained on a dataset). The model may then output the component's name based on the subgraph. In some systems, partition manager 408 may determine which component is responsible for certain behavior (e.g., represented by the ograph subgraph).

Figure 5A:
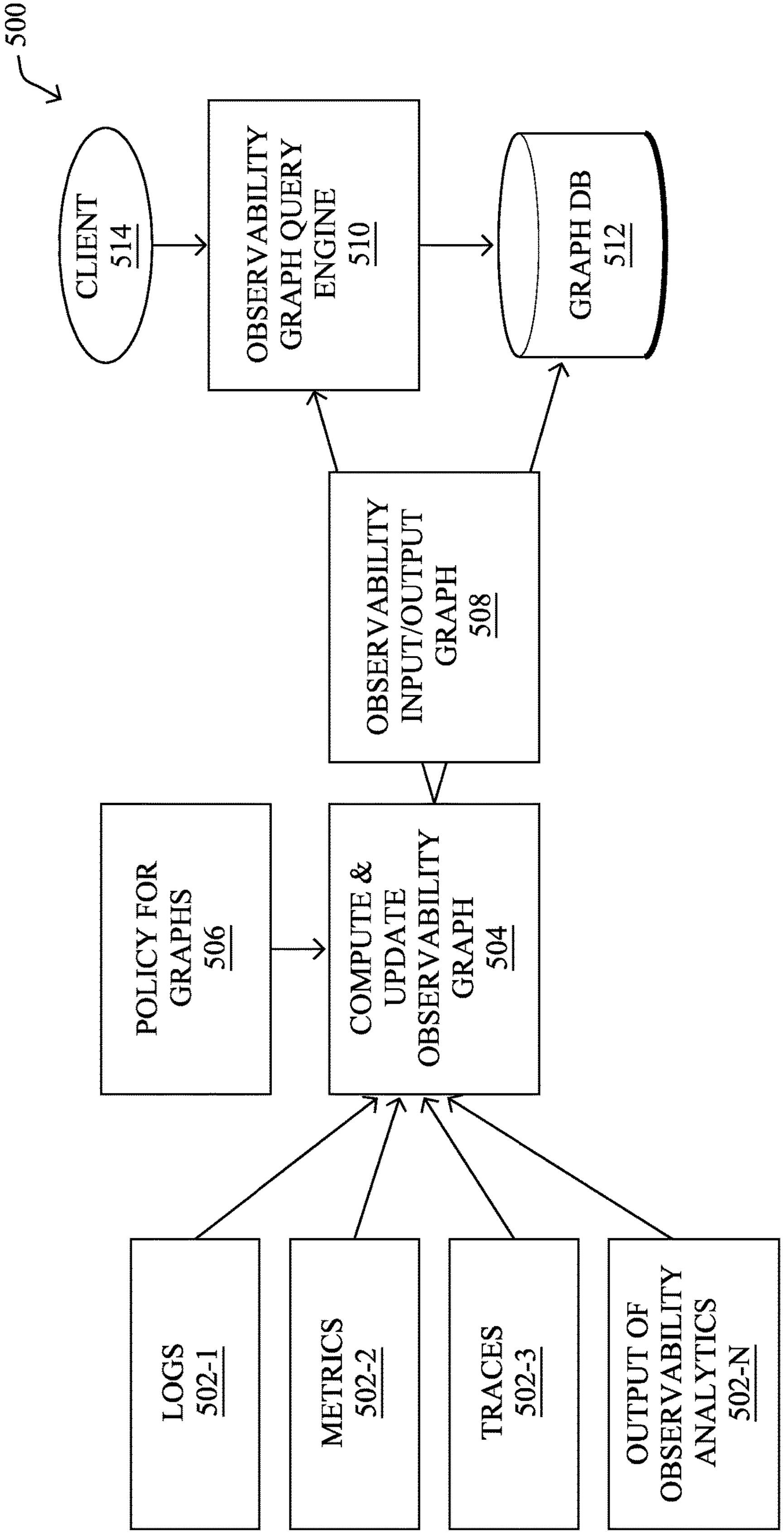
FIGS. 5A-5C illustrate examples of a deployment for observability data relationship graphing.
Figure 5B:
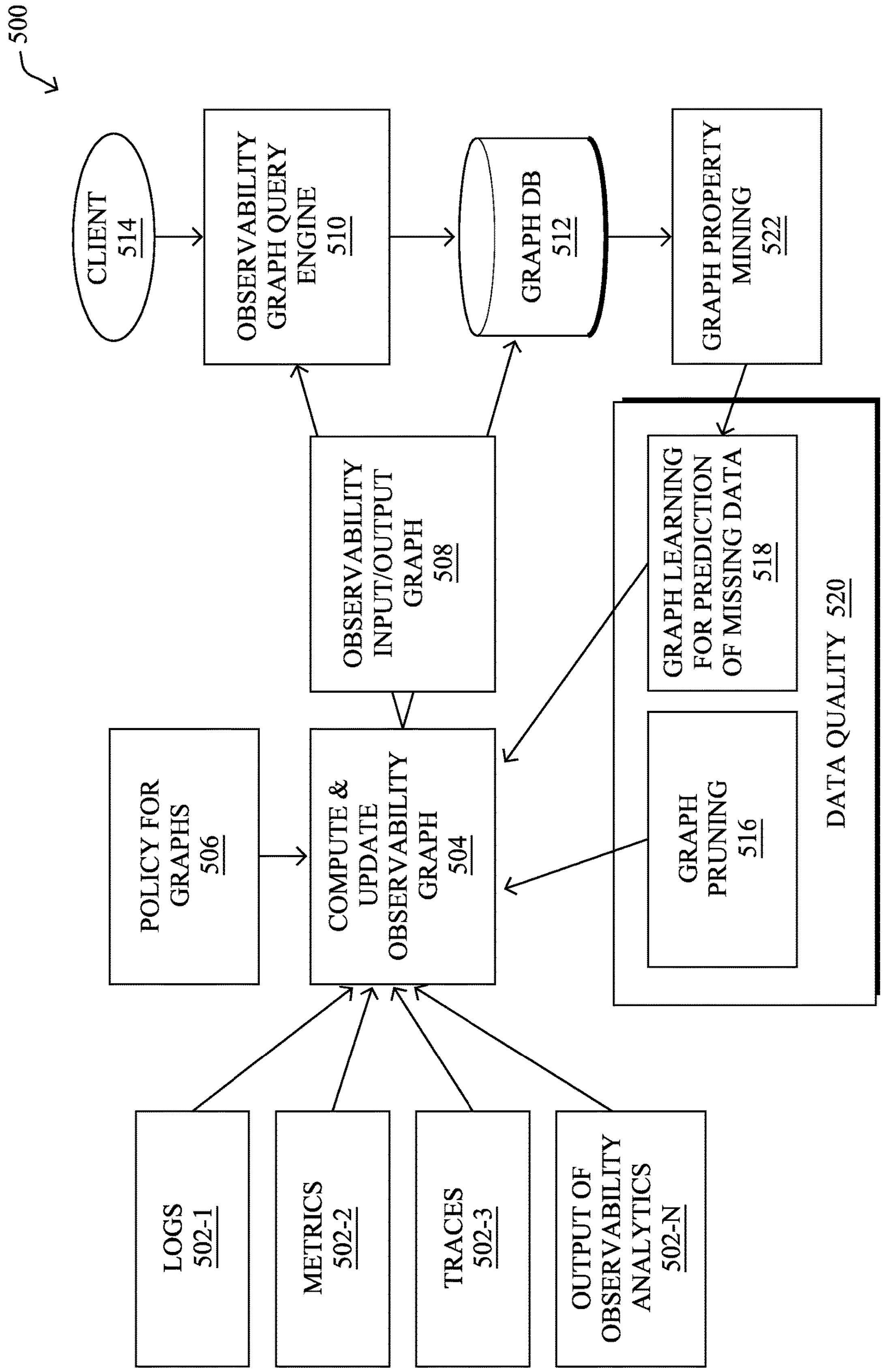
Figure 5C:
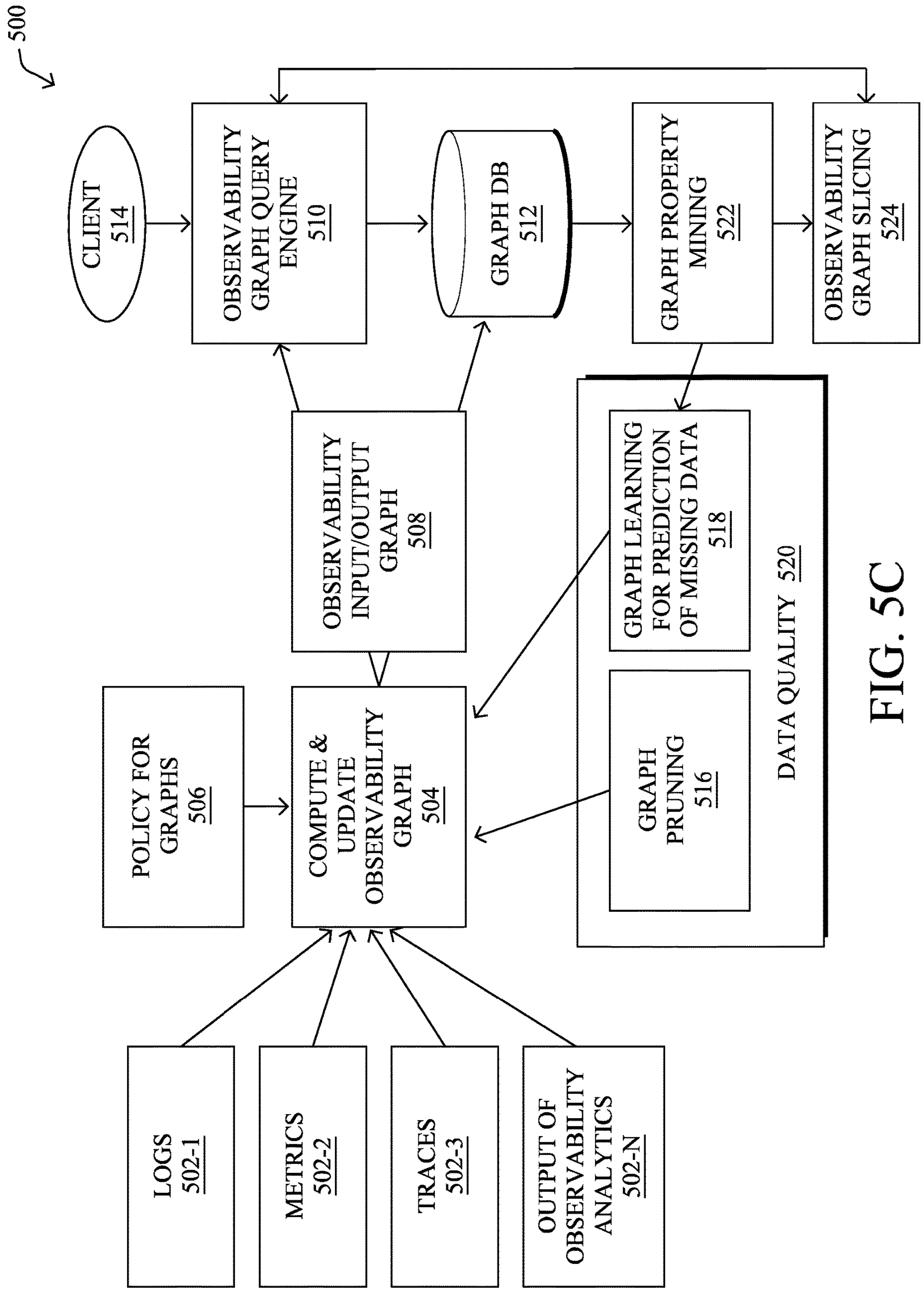

FIGS. 5A-5C illustrate examples of a deployment 500 for observability data relationship graphing, according to various embodiments. Deployment 500 may include a deployment of an architecture (e.g., architecture 400) within a computing network. For example, deployment 500 may include a deployment of an architecture for executing graphing process 248. In various embodiments, deployment 500 may include an execution of graphing process 248 by an observability intelligence platform and/or a visualization system for visualizing observability data for the computing network.

In deployment 500, observability data relationships may be computed and/or graphed by analysis of observability data 502 (e.g., 502-1 . . . 502-N). The observability data 502 may include telemetry data and/or analysis collected from a computer network for a given period of time. The observability data 502 may include MELT (e.g., metrics, events, logs, traces) data, output of observability analytics, etc.

For example, computation and/or updating of observability graphs may be performed at box 504 of deployment 500. The computation may include performance of a directed and/or undirected pre-computation of relationships between observability data 502. As previously described, the construction of the observability graph (e.g., ograph) may be conceptualized as being performed as occurring by two computational graphing phases. For instance, the construction of the ograph may occur through computation that combines the in-ograph and the output of observability such as analytics, root cause analysis, and this graph may be referred to as the observability out-ograph.

With respect to the in-ograph portion, pre-computation of relationships in the in-ograph may occur at box 504 by analysis of observability data 502 collected from sources such as microservices, components of a system, etc. in a computing network. From this analysis, a correlation may be performed. Specifically, each related data record may be correlated. Correlated data records from two different source may form an edge and may be directed when a specific flow of control or data is clearly identified. Therefore, in the in-ograph, each data record may be represented as a vertex and each relationship between two data records may be represented as an edge between the corresponding vertices.

In some instances, modifications to the data (e.g., vertices, edges, etc.) of the observability graphs may be identified at box 504. The modifications may be updates necessitated by new data, new data sources, new policies, etc. The modification may also be refinements to the data incorporated in the ographs. These modifications may be identified using machine learning techniques to determine and/or predict, for example, whether a vertex of an edge should be added to or removed from the observability graph when it is being constructed and/or updated. The determinations and/or predictions may be based on human input, ground-truth data, semi-supervised machine learning, etc. Any identified modifications may be performed to the in-ograph at box 504.

In addition, an out-ograph may be computed and/or constructed at box 504 of deployment 500. The out-ograph may be a weighted graph. For example, the out-ograph may be an ograph with weights assigned to edges. The weights may correspond to probabilities associated with the existence, strength, etc. of the relationship. For instance, the out-ograph may be constructed by addition of a vertex "x" for each record of output from analysis of the in-ograph. In addition, an edge may be added from "w" (e.g., a record of in-ograph or another vertex in out-graph that contributes to the analysis resulting in "x") to vertex "x."

The computation, updating, querying, etc. of the ograph at box 504 may be informed by one or more policy for the graphs 506. A policy for the ograph may represent the properties and/or configuration requirements of the ograph. For example, a policy may represent a duration for which the ograph is generated, query policies related to the ograph, whether the ograph supports a limited number of vertices or edges, whether directed or undirected edges are allows, semantic state requirements for the ograph, and so on. A policy may also specify the relationships allowed or disallowed (e.g., whitelists, blacklists, resp, etc.) for an ograph.

The computation, updating, querying, etc. of the ograph at box 504 may also be based on data quality metrics and/or techniques 520. For example, graph pruning 516 may be performed on the ograph. Performing graph pruning 516 may include causing the modification of the vertices and/or edges of in-ograph and/or out-ograph at box 504. In various embodiments, graph pruning 516 may include analysis of the in-ograph and/or out-ograph in order to determine if certain data records should be retained or pruned (e.g., removed from inclusion in the ograph, removed from display in the ograph, have a modified weighting assigned, sliced into a different subgraph, removed from a subgraph, etc.) from the observability data included in the ograph.

A data record may be identified for pruning if it is recognized and/or flagged as an outlier in the ograph. For example, a data record that is a member of a sparse subgraph without many edges and/or that is disconnected may be recognized and/or flagged as an outlier. As an outlier, these date records may be pruned from the ograph so that they are ignored in and/or absent from querying of dense graphs.

In addition, a data record may be identified for pruning on the basis of semantic rules specified in the policy for the graphs 506. For example, an edge between two observability data records may be pruned from the ograph if it shows an inconsistent state to that specified for the system in a semantic policy. Similarly, a vertex may be removed, added, and/or updated in order to achieve and/or maintain consistency, semantic or otherwise.

Graph pruning 516 may include recursively deleting other verticies and edges from the in-ograph and/or the out-ograph. For instance, if a vertex and/or an edge from an out-ograph is removed then it may be determined that other vertices need to be removed based on, for example, their relationship to the removed vertices and/or a source. Likewise, if a vertex and/or an edge from an in-ograph is removed, then other vertices and/or edges in the in-ograph and/or out-ograph may also need to be removed and/or added.

Data quality metrics and/or techniques 520 may also include applying graph learning 518 to the computation and/or updating of ographs at box 504. Applying graph learning 518 may include causing the identification of missing data sources, data elements (e.g., a vertex, an edge, observability data, etc.), and/or data relationships within the ograph (e.g., within in-ograph and/or out-ograph) at box 504.

For instance, graph learning 518, including machine learning techniques, graph neural network techniques, deep learning techniques, etc., that may be used to determine if a vertex, an edge, and/or a data source is missing from an ograph. A missing data source may be identified by finding vertices in the in-ograph or the out-ograph that include a reference to the missing data sources (e.g., such as by their IP address, host name, service ID, etc.). In various embodiments, it can be inferred if more data is missing or relationships between vertices are missing from the type of data in a vertex as well.

Once a missing data source, data element, data relationships, etc. is identified as missing from an in-ograph and/or out-ograph, then an alert may be generated and/or that missing data may be retrieved. For example, if a data source is identified as missing, then an alert may be generated for the data source and/or, with user input and/or input from analytics engines, data may be retrieved and/or added to the ograph for that data source.

The data quality metrics and/or techniques 520 in deployment 500 may also include the results of data quality analysis for the in-ograph and/or out-ograph. For example, data quality metrics may be determined from graph properties, missing data and/or vertices, etc. of the in-ograph and/or out-ograph.

The data quality metrics may include a data quality score that may be computed as a statistical score. The data quality score may be a vector representing different factors of data quality. Data quality may refer to how reliable the underlying observability is and/or how reliable the observability system is functioning in a particular time frame.

The data quality may further be utilized to determine whether certain analysis and/or inferences from the data can be relied upon or whether further data is needed to improve the reliability of the in-ograph and/or out-ograph. These data quality metrics may be used for computation and/or updating of the in-ograph and/or out-ograph.

Following computation and/or updating of the in-ograph and/or out-ograph at box 504, the constructed and/or updated in-ograph and/or out-ograph 508 may be output from box 504. Outputting the in-ograph and/or out-ograph 508 may include saving it to a graph database 512.

In various embodiments, client 514 may submit queries of the in-ograph and/or out-ograph 508. For example, the client 514 may submit such a query to an observability graph query engine 510 which may execute the query of the in-ograph and/or out-ograph 508 on behalf of the client 514 and/or return a response to the client 514. Therefore, outputting the in-ograph and/or out-ograph 508 may include exposing them to the observability graph query engine 510. Exposing the in-ograph and/or out-ograph 508 to the observability graph query engine 510 may include providing a copy of the in-ograph and/or out-ograph 508 for query directly to the observability graph query engine 510 or by saving the in-ograph and/or out-ograph 508 to a location in graph databased 512 where it can be accessed for query by the observability graph query engine 510.

Additionally, graph property mining 522 may be performed in deployment 500. Graph property mining 522 may include analysis of the in-ograph and/or out-ograph 508 saved in graph database 512. Specifically, graph property mining 522 may include determining graph properties from analysis of those ographs. In various embodiments, graph property mining 522 may include identifying a diameter, a centroid, cycles (e.g., associated with identifying inconsistencies in the data), longest paths, shortest paths, the impact of one event on other parts of the system, dominators (e.g., the hosts and/or data sources for observability data that are behaving as bottlenecks and/or should be scaled out or better protected), etc. form analysis of the data of in-ograph and/or out-ograph 508.

The results (e.g., determined graph properties) of graph property mining 522 may be provided to and/or used to develop, train, or refine graph learning 518 and/or its underlying machine learning models. As such, graph property mining 522 may be used to improve graph learning 518 and/or its predictions of missing data sources, data elements, data relationships, etc. within the observability data in the ographs.

Deployment 500 may also include observability graph slicing 524. Observability graph slicing 524 may include the slicing or partitioning of data in the in-ograph and/or out-ograph. The data in the in-ograph and/or out-ograph may be sliced or partitioned based on certain criteria such as data quality, relationships, weights associated with the edges, degrees of vertices, other graph properties, data source parameters, time parameters, other parameters, etc. Slicing of observability graph may result in a forest of subgraphs representing certain criteria such as performance metric of one external API across a set of microservices.

Deployment 500 may produce in-ographs and/or out-ographs 508 that have been refined through application of the various components described with respect to deployment 500. These refined in-ographs and/or out-ographs 508 may provide reliable, high-quality representations of observability data and its relationships for a computer network. This output may be utilized by clients 514 and/or observability intelligence platforms and/or visualization systems to visualize network performance, to monitor network performance and analytics and/or to perform root cause analyses, among various other network management functions. In addition, deployment 500 provides a mechanism for monitoring and/or maintaining the quality of the observability data and/or the ograph outputs. Further, deployment 500 utilizes this graphing and/or graph refining methodology to re-create missing data and semantic consistency using the correlation between data objects and data set data.

Figure 6:
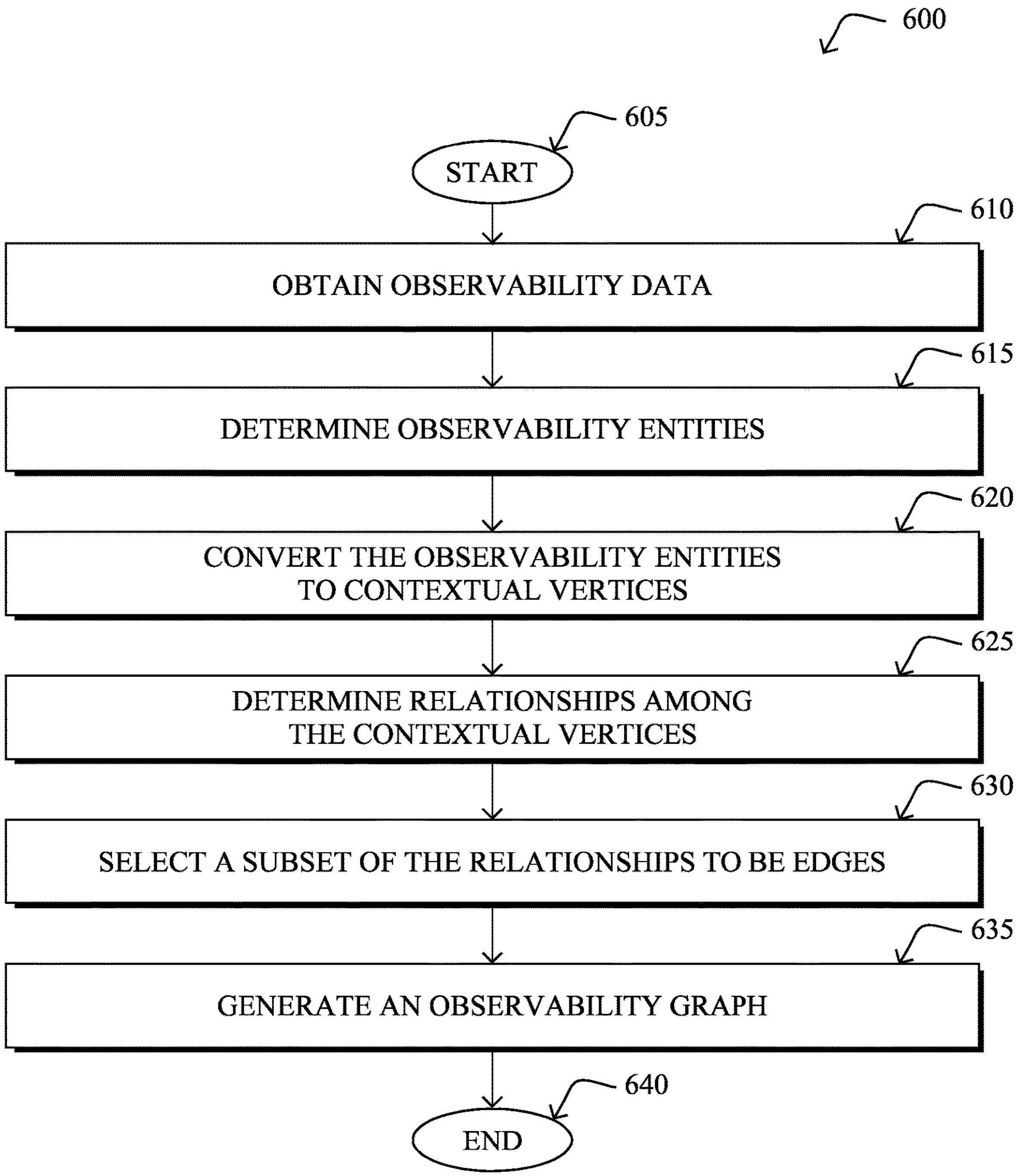
FIG. 6 illustrates an example simplified procedure for generating observability data relationship graphs in accordance with one or more embodiments described herein.

In closing. FIG. 6 illustrates an example simplified procedure for generating observability data relationship graphs in accordance with one or more embodiments described herein, particularly from the perspective of a device executing and/or in communication with an observability intelligence platform and/or visualization system. For example, a non-generic, specifically configured device (e.g., device 200) may perform procedure 600 by executing stored instructions (e.g., graphing process 248). The procedure 600 may start at step 605, and continues to step 610, where, as described in greater detail above, a device may obtain observability data for a computer system for a given period of time. As used herein, a computer system may include a computer network, distributed, non-distributed, decentralized computing, individual computers, etc.

At step 615, as described in greater detail above, the device may determine observability entities from the observability data. The observability entities may include atomic units of observability data such as a portion of a log entry, a measure of a metric, a unit of a trace, observability analytics metrics, etc. Determining the observability entities may additionally include determining a source component in the computer system for the observability data and/or observability analytics metrics.

As noted above, at step 620 the device may convert the observability entities into contextual vertices having associated vertex attributes. The vertex attributes may include observability data values, identifiers of the source of the data, characteristics of the data and/or sources, etc. Certain ones of the contextual vertexes may be related to one another. That is, those contextual vertices may interact, share characteristics with, and/or influence one another.

Further to the detailed discussion above, at step 625 the device may determine relationships among the contextual vertices based on correlation of the observability data. Determining the relationships among the contextual vertices may include identifying the relationships that exist between the contextual vertices (e.g., how those contextual vertices may interact, share characteristics with, and/or influence one another). The relationships may be temporal, spatial, causal, and/or some other type of relationship and may be identified by analysis and/or observation of the vertex attributes and/or interactions.

At step 630 the device may select a subset of the relationships to be edges based on a quality of the relationships, the edges having associated edge attributes. The edges may provide relational context to contextual vertex pairs. The device may infer, predict, compute, and/or assign labels, directionality, and/or weights to each of the edges. As described in greater detail above, at step 635 the device may generate an observability graph for the observability data for the computing system for the given time period by connecting the contextual vertices via corresponding edges. The observability graph may be configured according to a selection of at least one of a node-to-node view, a host-to-host view, or a connectivity view. The observability graph may identify at least one of a plurality of different source nodes for the observability data, a plurality of different edge labels, or a plurality of different edge attributes. The observability graph may be updated dynamically with new observability data.

The observability graph may include temporal boundaries defined by timestamps associated with the observability data. The observability graph may be modified based on a data quality analysis of the observability data included in the observability graph. For example, the observability graph may be modified by pruning at least one of a contextual vertex or its corresponding edge based on a determination that they are a portion of an outlier subgraph of the observability graph or that they are inconsistent with a semantic state of the observability graph. In additional examples, the observability graph may be modified by partitioning the contextual vertices and the corresponding edges of the observability graph into semantically consistent portions.

The simplified procedure 600 may then end in step 640, notably with the ability to continue updating and/or refining the observability graph through graph pruning, policy enforcement, graph learning predictions, data quality metrics, graph property mining, query improvement, etc. In addition, the procedure 600 may be extended to include exposing the observability graph to queries and utilizing the observability graph to perform anomaly detection in the computer network.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide mechanisms for constructing and updating observability data relationship graphs. In particular, the techniques herein provide mechanism for pre-computation of relationships between observability data, representing this data and its relationships within an observability graph, and updating the observability graph. The techniques may provide for refinement of the observability data and/or the observability graph. For instance, the techniques introduce refinements such as graph pruning to achieve semantic and other consistency, graph learning for predicting missing data, graph slicing, etc. By constructing observability graphs that include contextual vertices and precomputed edge relationship insights that are subject to refinements and updates, these techniques facilitate holistic analysis of network performance that incorporates pre-computed relationships and/or behavioral correlations into decision making regarding network management, debugging, etc.

Illustratively, the techniques described herein may be performed by hardware, software, and/or firmware, such as in accordance with the illustrative graphing process 248, which may include computer executable instructions executed by the processor 220 to perform functions relating to the techniques described herein, e.g., in conjunction with corresponding processes of other devices in the computer network as described herein (e.g., on network agents, controllers, computing devices, servers, etc.). In addition, the components herein may be implemented on a singular device or in a distributed manner, in which case the combination of executing devices can be viewed as their own singular "device" for purposes of executing the graphing process 248.

According to the embodiments herein, an illustrative method herein may comprise: obtaining, by a device, observability data for a computer system for a given time period; determining, by the device, observability entities from the observability data; converting, by the device, the observability entities into contextual vertices having associated vertex attributes; determining, by the device, relationships among the contextual vertices based on correlation of the observability data; selecting, by the device, a subset of the relationships to be edges based on a quality of the relationships, the edges having associated edge attributes; and generating, by the device, an observability graph for the observability data for the computer system for the given time period by connecting the contextual vertices via corresponding edges.

In one embodiment, the method further comprises configuring the observability graph according to a selection of at least one of a node-to-node view, a host-to-host view, or a connectivity view. In one embodiment, the observability graph identifies at least one of a plurality of different source nodes for the observability data, a plurality of different edge labels, or a plurality of different edge attributes. In one embodiment, the observability graph is updated dynamically with new observability data. In one embodiment, the observability graph includes temporal boundaries defined by timestamps associated with the observability data.

In one embodiment, the method further comprises modifying the observability graph based on a data quality analysis of the observability data in the observability graph. In one embodiment, modifying the observability graph comprises: pruning at least one of a contextual vertex or its corresponding edge based on a determination that they are a portion of an outlier subgraph of the observability graph or that they are inconsistent with a semantic state of the observability graph. In one embodiment, modifying the observability graph comprises: using a machine learning technique to identify whether a data source is missing in the observability graph. In one embodiment, modifying the observability graph comprises: partitioning the contextual vertices and the corresponding edges of the observability graph into semantically consistent portions. In one embodiment, the method further comprises performing anomaly detection based on the observability graph.

According to the embodiments herein, an illustrative tangible, non-transitory, computer-readable medium herein may have computer-executable instructions stored thereon that, when executed by a processor on a computer, may cause the computer to perform a method comprising: obtaining observability data for a computer system for a given time period; determining observability entities from the observability data; converting the observability entities into contextual vertices having associated vertex attributes; determining relationships among the contextual vertices based on correlation of the observability data; selecting a subset of the relationships to be edges based on a quality of the relationships, the edges having associated edge attributes; and generating an observability graph for the observability data for the computer system for the given time period by connecting the contextual vertices via corresponding edges.

Further, according to the embodiments herein an illustrative apparatus herein may comprise: one or more network interfaces to communicate with a network; a processor coupled to the network interfaces and configured to execute one or more processes; and a memory configured to store a process that is executable by the processor, the process, when executed, configured to: obtain observability data for a computer system for a given time period; determine observability entities from the observability data; convert the observability entities into contextual vertices having associated vertex attributes; determine relationships among the contextual vertices based on correlation of the observability data; select a subset of the relationships to be edges based on a quality of the relationships, the edges having associated edge attributes; and generate an observability graph for the observability data for the computer system for the given time period by connecting the contextual vertices via corresponding edges.

While there have been shown and described illustrative embodiments above, it is to be understood that various other adaptations and modifications may be made within the scope of the embodiments herein. For example, while certain embodiments are described herein with respect to certain types of networks in particular, the techniques are not limited as such and may be used with any computer network, generally, in other embodiments. Moreover, while specific technologies, protocols, and associated devices have been shown, such as Java, TCP, IP, and so on, other suitable technologies, protocols, and associated devices may be used in accordance with the techniques described above. In addition, while certain devices are shown, and with certain functionality being performed on certain devices, other suitable devices and process locations may be used, accordingly. That is, the embodiments have been shown and described herein with relation to specific network configurations (orientations, topologies, protocols, terminology, processing locations, etc.). However, the embodiments in their broader sense are not as limited, and may, in fact, be used with other types of networks, protocols, and configurations.

Moreover, while the present disclosure contains many other specifics, these should not be construed as limitations on the scope of any embodiment or of what may be claimed, but rather as descriptions of features that may be specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method, comprising:

obtaining, by a device, observability data for a computer system for a given time period, wherein the observability data comprises telemetry data and metrics, events, logs, and traces (MELT) data;

determining, by the device, observability entities from the observability data;

converting, by the device, the observability entities into contextual vertices having associated vertex attributes;

determining, by the device, relationships among the contextual vertices based on correlation of the observability data;

selecting, by the device and by using machine learning, a subset of the relationships as edges based on a quality of the relationships, the edges having associated edge attributes;

generating, by the device, an observability graph for the observability data for the computer system for the given time period by connecting the contextual vertices via corresponding edges;

modifying, by the device, the observability graph based on a semantic consistency policy applied to the observability data to generate a modified observability graph, wherein the semantic consistency policy specifies semantic state requirements for the contextual vertices and the corresponding edges of the observability graph, and wherein modifying comprises analyzing the observability graph and determining that at least one of a contextual vertex or a corresponding edge has an inconsistent semantic state relative to the semantic state requirements specified by the semantic consistency policy, and pruning, in response to making the determination, the at least one of the contextual vertex or the corresponding edge to bring the modified observability graph into compliance with the semantic state requirements;

presenting, by the device, the modified observability graph to a user interface of a display, wherein the modified observability graph is dynamically updated by the device with new observability data for subsequent time periods;

detecting, by the device, an anomalous subgraph pattern within the modified observability graph as dynamically updated, the anomalous subgraph pattern being associated with a system condition affecting performance or security of the computer system; and performing, by the device, a remediation operation to correct the system condition in response to detecting the anomalous subgraph pattern.

2. The method as in claim 1, further comprising:

configuring the modified observability graph according to a selection of at least one of a node-to-node view, a host-to-host view, or a connectivity view.

3. The method as in claim 1, wherein the observability graph identifies at least one of a plurality of different source nodes for the observability data, a plurality of different edge labels, or a plurality of different edge attributes.

4. The method as in claim 1, wherein the observability graph includes temporal boundaries defined by timestamps associated with the observability data.

5. The method as in claim 1, further comprising:

modifying the observability graph based on a data quality analysis of the observability data in the observability graph.

6. The method as in claim 5, wherein modifying the observability graph comprises:

pruning at least one of a contextual vertex or its corresponding edge based on a determination that they are a portion of an outlier subgraph of the observability graph.

7. The method as in claim 5, wherein modifying the observability graph comprises:

using a machine learning technique to identify whether a data source is missing in the observability graph.

8. The method as in claim 5, wherein modifying the observability graph comprises:

partitioning the contextual vertices and the corresponding edges of the observability graph into semantically consistent portions.

9. The method as in claim 1, further comprising:

performing anomaly detection based on the modified observability graph.

10. A tangible, non-transitory, computer-readable medium having computer-executable instructions stored thereon that, when executed by a processor on a computer, cause the computer to perform a method comprising:

obtaining observability data for a computer system for a given time period, wherein the observability data comprises telemetry data and metrics, events, logs, and traces (MELT) data;

determining observability entities from the observability data;

converting the observability entities into contextual vertices having associated vertex attributes;

determining relationships among the contextual vertices based on correlation of the observability data;

selecting, by using machine learning, a subset of the relationships as edges based on a quality of the relationships, the edges having associated edge attributes;

generating an observability graph for the observability data for the computer system for the given time period by connecting the contextual vertices via corresponding edges;

modifying the observability graph based on a semantic consistency policy applied to the observability data to generate a modified observability graph, wherein the semantic consistency policy specifies semantic state requirements for the contextual vertices and the corresponding edges of the observability graph, and wherein modifying comprises analyzing the observability graph and determining that at least one of a contextual vertex or a corresponding edge has an inconsistent semantic state relative to the semantic state requirements specified by the semantic consistency policy, and pruning, in response to making the determination, the at least one of the contextual vertex or the corresponding edge to bring the modified observability graph into compliance with the semantic state requirements;

presenting the modified observability graph to a user interface of a display, wherein the modified observability graph is dynamically updated by the computer with new observability data for subsequent time periods;

detecting an anomalous subgraph pattern within the modified observability graph as dynamically updated, the anomalous subgraph pattern being associated with a system condition affecting performance or security of the computer system; and performing a remediation operation to correct the system condition in response to detecting the anomalous subgraph pattern.

11. The tangible, non-transitory, computer-readable medium as in claim 10, wherein the method further comprises:

configuring the modified observability graph according to a selection of at least one of a node-to-node view, a host-to-host view, or a connectivity view.

12. The tangible, non-transitory, computer-readable medium as in claim 10, wherein the observability graph identifies at least one of a plurality of different source nodes for the observability data, a plurality of different edge labels, or a plurality of different edge attributes.

13. The tangible, non-transitory, computer-readable medium as in claim 10, wherein the observability graph includes temporal boundaries defined by timestamps associated with the observability data.

14. The tangible, non-transitory, computer-readable medium as in claim 10, wherein the method further comprises:

modifying the observability graph based on a quality analysis of the observability data.

15. The tangible, non-transitory, computer-readable medium as in claim 14, wherein modifying the observability graph comprises:

pruning at least one of a contextual vertex or its corresponding edge based on a determination that they are a portion of an outlier subgraph of the observability graph.

16. The tangible, non-transitory, computer-readable medium as in claim 14, wherein modifying the observability graph comprises:

using a machine learning technique to identify whether a data source is missing in the observability graph.

17. The tangible, non-transitory, computer-readable medium as in claim 14, wherein modifying the observability graph comprises:

partitioning the contextual vertices and the corresponding edges of the observability graph into semantically consistent portions.

18. An apparatus, comprising:

one or more network interfaces to communicate with a network;

a processor coupled to the one or more network interfaces and configured to execute one or more processes; and a memory configured to store a process that is executable by the processor, the process, when executed, configured to:

obtain observability data for a computer system for a given time period, wherein the observability data comprises telemetry data and metrics, events, logs, and traces (MELT) data;

determine observability entities from the observability data;

convert the observability entities into contextual vertices having associated vertex attributes;

determine relationships among the contextual vertices based on correlation of the observability data;

select, by using machine learning, a subset of the relationships as edges based on a quality of the relationships, the edges having associated edge attributes;

generate an observability graph for the observability data for the computer system for the given time period by connecting the contextual vertices via corresponding edges;

modify the observability graph based on a semantic consistency policy applied to the observability data to generate a modified observability graph, wherein the semantic consistency policy specifies semantic state requirements for the contextual vertices and the corresponding edges of the observability graph, and wherein modifying comprises analyzing the observability graph and determining that at least one of a contextual vertex or a corresponding edge has an inconsistent semantic state relative to the semantic state requirements specified by the semantic consistency policy, and pruning, in response to making the determination, the at least one of the contextual vertex or the corresponding edge to bring the modified observability graph into compliance with the semantic state requirements;

present the modified observability graph to a user interface of a display, wherein the modified observability graph is dynamically updated by the apparatus with new observability data for subsequent time periods;

detect an anomalous subgraph pattern within the modified observability graph as dynamically updated, the anomalous subgraph pattern being associated with a system condition affecting performance or security of the computer system; and perform a remediation operation to correct the system condition in response to detecting the anomalous subgraph pattern.

* * * * *